US008365995B2

(12) United States Patent
Jiang et al.

(10) Patent No.: US 8,365,995 B2
(45) Date of Patent: Feb. 5, 2013

(54) MULTI-CHECKPOINT TYPE CLUSTERED FRUIT FLY COUNTING DEVICE

(75) Inventors: Joe-Air Jiang, Taipei (TW); En-Cheng Yang, Taipei (TW); Chwan-Lu Tseng, Taipei (TW); Chia-Pang Chen, Taipei (TW); Tzu-Shiang Lin, Taipei (TW); Yung-Cheng Wu, Taipei (TW); Chen-Ying Lin, Taipei (TW); Chu-Ping Tseng, Taipei (TW); Shih-Hsiang Lin, Taipei (TW); Chih-Sheng Liao, Taipei (TW); Shih-Hao Szu, Taipei (TW); Chung-Wei Yen, Taipei (TW); Kuang-Chang Lin, Taipei (TW); Zong-Siou Wu, Taipei (TW); Fu-Ming Lu, Taipei (TW)

(73) Assignee: National Taiwan University, Taipei (TW)

( * ) Notice: Subject to any disclaimer, the term of this patent is extended or adjusted under 35 U.S.C. 154(b) by 347 days.

(21) Appl. No.: 12/194,881

(22) Filed: Aug. 20, 2008

(65) Prior Publication Data

US 2009/0252284 A1 Oct. 8, 2009

(30) Foreign Application Priority Data

Apr. 3, 2008 (TW) ............................... 97112115 A

(51) Int. Cl.
*A01M 1/20* (2006.01)

(52) U.S. Cl. ............................... 235/385; 43/107; 43/58

(58) Field of Classification Search ........... 43/65, 132.1, 43/107; 424/405, 84; 235/385
See application file for complete search history.

(56) References Cited

U.S. PATENT DOCUMENTS

| | | | | |
|---|---|---|---|---|
| 5,698,208 | A * | 12/1997 | Nigg et al. | 424/84 |
| 6,493,363 | B1 * | 12/2002 | Weaver et al. | 370/539 |
| 6,653,971 | B1 * | 11/2003 | Guice et al. | 342/27 |
| 7,516,572 | B2 * | 4/2009 | Yang et al. | 43/114 |
| 2006/0086039 | A1 * | 4/2006 | Israely et al. | 43/132.1 |

FOREIGN PATENT DOCUMENTS

JP 11155458 A * 6/1999

* cited by examiner

*Primary Examiner* — Thien M Le
*Assistant Examiner* — Christle Marshall

(57) ABSTRACT

A multi-checkpoint type clustered animal counting device is proposed, which is capable of providing a counting function that can be used for statistically determining the number of animals (such as fruit flies) within a region such as farmland or garden. The proposed animal counting device is characterized by the utilized to at least two object sensors, wherein the first object sensor is disposed at a first checkpoint while the second object sensor is disposed at a second checkpoint, and wherein the first object sensor is initially set to power-on state while the second object sensor is initially set to power-off state and can be switched on only when the first object sensor is triggered. When the second object sensor is triggered, the counting operation will increase the output count number by one. This feature allows a more accurate result and can help save power consumption.

22 Claims, 5 Drawing Sheets

| Pest Movement | Flag F1 | Flag F2 | Counter |
|---|---|---|---|
| At Entrance | 0 | 0 | Unchanged |
| Passing 1st Checkpoint | 1 | 0 | Unchanged |
| Passing 2nd Checkpoint | 1 | 1 | Add 1 |
| Lingering at 2nd Checkpoint | 0 | 1 | Unchanged |

FIG. 5

MULTI-CHECKPOINT TYPE CLUSTERED FRUIT FLY COUNTING DEVICE

BACKGROUND OF THE INVENTION

1. Field of the Invention

This invention relates to ecological environment monitoring technology, and more particularly, to a multi-checkpoint type clustered animal counting device which is designed for installation at a region full of animals, such as a farmland or garden full of pests (such as fruit flies), for providing a counting function that can be used for statistically determining the number of pests within that region.

2. Description of Related Art

In agricultural research and management, it is an important task to monitor the ecological environment of a farmland used to cultivate crops such as fruits, rice, and vegetables. The main purpose is to collect a set of ecological data that are considered as vital factors that would significantly affect the cultivation and growth of crops on the farmland. These ecological data include, for example, number of clustered pests per unit area, temperature, humidity, sunlight amount, wind speed, to name a few. Research personnel can then analyze these ecological data for management of the farmland to achieve optimized crop production.

Traditionally, the collection of ecological data from farmlands is carried out by human labor work. For example, the number of pests per unit area is collected by firstly using a net to capture a group of pests within a certain area, and then visually counting the total number of pests being captured in the net, and finally using statistical methods to estimate the total number of pests within the entire area. For collection of climate-related ecological data (temperature, humidity, sunlight amount, wind speed, etc.), this task is traditionally carried out by installing temperature sensors, humidity sensors, sunlight amount sensors, wind speed sensors on the farmland; and the sensed data are visually inspected and manually recorded by the research/management personnel. The collected ecological data are then analyzed and compiled by the research personnel into written reports. These written reports are then used as references for management of the farmland to achieve optimized crop production.

One apparent drawback to the labor-based work for ecological data collection is that it is quite tedious, laborious, and time-consuming for the research/management personnel to carry out. Moreover, if the farmland is located at a remote site, such as a distant mountain or rural place, the research/management personnel might have to spend lots of time and cost in the travel to the farmland.

Moreover, since the estimation of the number of pests within the farmland is carried out by manually capturing the pests and visually counting their total number, it would be not only tedious, laborious, and time-consuming for the research/management personnel to carry out, but would cause the result to be highly inaccurate. One solution to this problem is to use an infrared-interrupt type of object sensor which is installed within a bottle that can lure the pests into crawl such that when a pest passes the object sensor, an infrared beam will be interrupted, thereby triggering a counter to increase its count.

One drawback to the above-mentioned pest-counting operation, however, is that only one sensor is used for detecting the presence of the pest, which would easily cause erroneous result. For instance, if a pest retreats backwards after it has passed the sensor, the sensor will be triggered again, resulting in a count of 2, but actually there is only one pest. Moreover, since most pests (such as fruit flies) have wings, if a winged pest lingers at the sensor for a long time and repeatedly flaps its wings, then the repeated wing flapping of the pest would cause the sensor to be repeatedly triggered again and again, resulting in an erroneous count.

SUMMARY OF THE INVENTION

It is therefore an objective of this invention to provide a multi-checkpoint type clustered animal counting device which can provide an automatic pest-counting operation without intervention of human labor.

It is another objective of this invention to provide a multi-checkpoint type clustered animal counting device which can offer a more accurate result of pest counting.

It is still another objective of this invention to provide a multi-checkpoint type clustered animal counting device which can operate with less power consumption.

It is yet another objective of this invention to provide a multi-checkpoint type clustered animal counting device which can be used a system component for integration to a sensing node in a wireless sensing network (WSN) for remote monitoring of the ecological environment of a remote farmland.

The multi-checkpoint type clustered animal counting device according to the invention is designed for installation at a region full of animals, such as a farmland or garden full of pests (such as fruit flies), for providing a counting function that can be used for statistically determining the number of pests within that region.

In construction, the multi-checkpoint type clustered animal counting device according to the invention comprises: (A) a container module; (B) a multi-checkpoint object sensing module; (C) a trigger state registering module; and (D) a counter module; and can further optionally comprise: decoying means and a timer-controlled power module.

The multi-checkpoint type clustered animal counting device according to the invention is characterized by the utilized to at least two object sensors, wherein the first object sensor is disposed at a first checkpoint while the second object sensor is disposed at a second checkpoint, and wherein the first object sensor is initially set to power-on state while the second object sensor is initially set to power-off state and can be switched on only when the first object sensor is triggered. When the second object sensor is triggered, the counting operation will increase the output count number by one. This feature allows a more accurate result and can help save power consumption.

BRIEF DESCRIPTION OF DRAWINGS

The invention can be more fully understood by reading the following detailed description of the preferred embodiments, with reference made to the accompanying drawings, wherein:

FIG. 5 is a truth table used to show the various operating conditions of multi-checkpoint type clustered animal counting device of the invention in response to the movement of a pest within the container module.

DETAILED DESCRIPTION OF PREFERRED EMBODIMENTS

The multi-checkpoint type clustered animal counting device according to the invention is disclosed in full details by way of preferred embodiments in the following with reference to the accompanying drawings.

Application of the Invention

Figure 1:
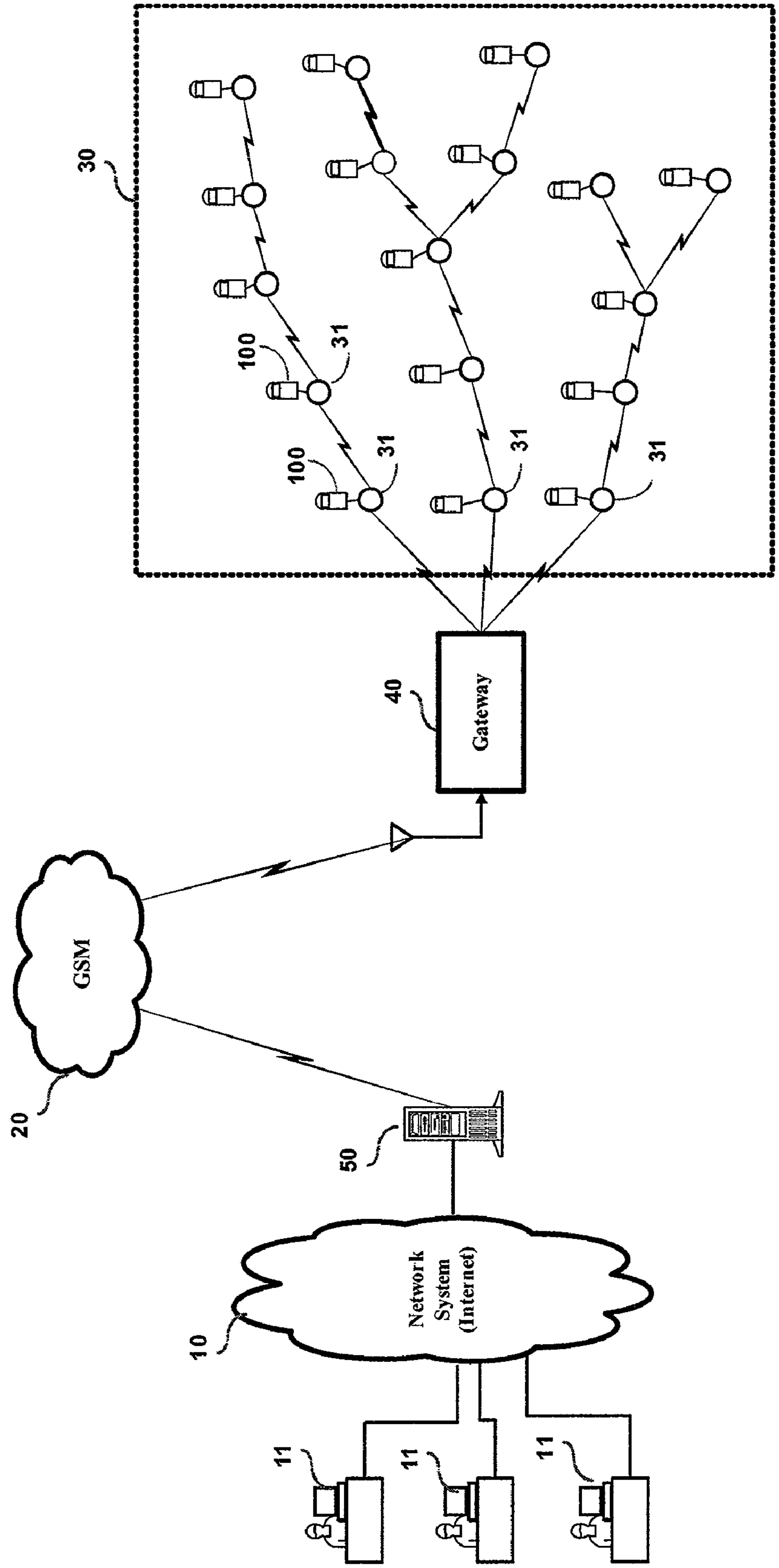
FIG. 1 is a schematic diagram used to depict the application of the multi-checkpoint type clustered animal counting device of the invention.

FIG. 1 is a schematic diagram showing an application example of the multi-checkpoint type clustered animal counting device according to the invention (which is here encapsulated in a box indicated by the reference numeral 100, and is hereinafter referred in short as "animal counting device"). As shown, the animal counting device of the invention 100 is designed for use with a network-based ecological environment remote monitoring system (which is used, for example, for remote monitoring of the ecological environment of a farmland or a garden) whose architecture includes a network system 10, a wireless communication system 20, a wireless sensing network (WSN) 30, a gateway 40, and a host server 50. The wireless sensing network 30 is composed of a plurality of sensor nodes 31. The animal counting device of the invention 100 is integrated to each of the sensor nodes 31. In practice, for example, the network system 10 is the Internet or an intranet/extranet system; and the wireless communication system 20 is a GSM (Global System for Mobile Communications) compliant system. In operation, the animal counting device of the invention 100 will generate a count number and transfer the count number data to the sensor nodes 31 which can then transfer the count number data via the gateway 40 and the wireless communication system 20 to the host server 50, such that researchers and management personnel can browse the count number data by linking a network workstation 11 via the network system 10 to the host server 50.

However, it is to be noted that, beside the aforementioned application example, the animal counting device of the invention 100 can also be used for integration to various other different types of monitoring systems, or alternatively operate as an independent unit which can output the count number data directly to a built-in LCD screen (not shown) so that users can directly read the count number data from the built-in LCD screen.

Function of the Invention

Figure 2:
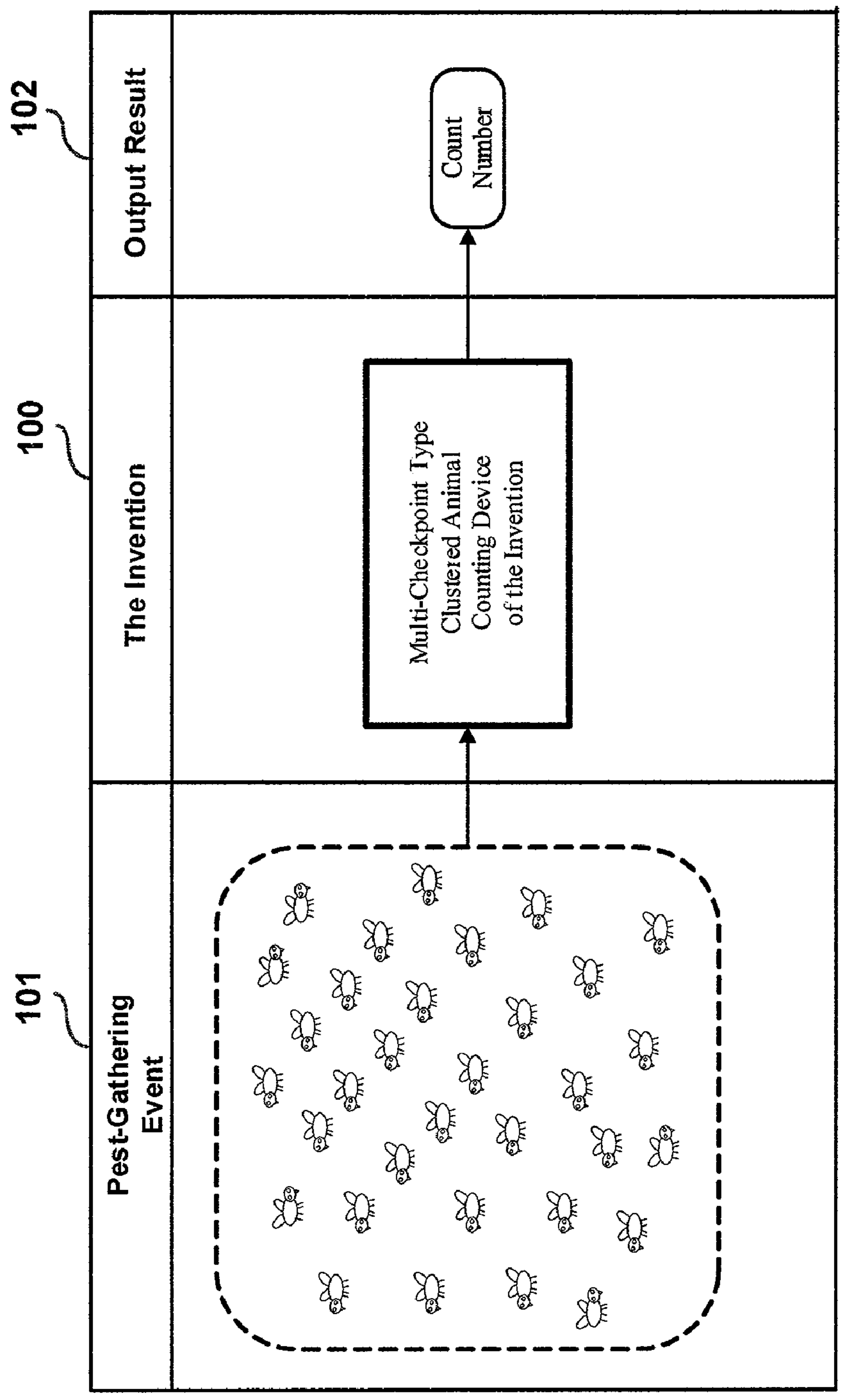
FIG. 2 is a schematic diagram used to depict the function of the multi-checkpoint type clustered animal counting device of the invention.

FIG. 2 is a schematic diagram used to depict the functional model of the animal counting device of the invention 100. In practice, the animal counting device of the invention 100 is used for installation at a location (such as a farmland or a garden) where a group of animals (such as pests) inhabit, for counting these pests by alluring them into its inside. Based on an event-responding functional model, the animal counting device of the invention 100 can respond to a pest-gathering event 101 that occurs in the surrounding environment by luring a group of the pests into its inside and count the number of these pests, thereby generating a count number for the pests as the output result 102 of the invention.

Broadly speaking, the animal counting device of the invention 100 is not limited to the use of counting pests such as fruit flies, and can be any insects or large animals.

Architecture of the Invention

Figure 3:
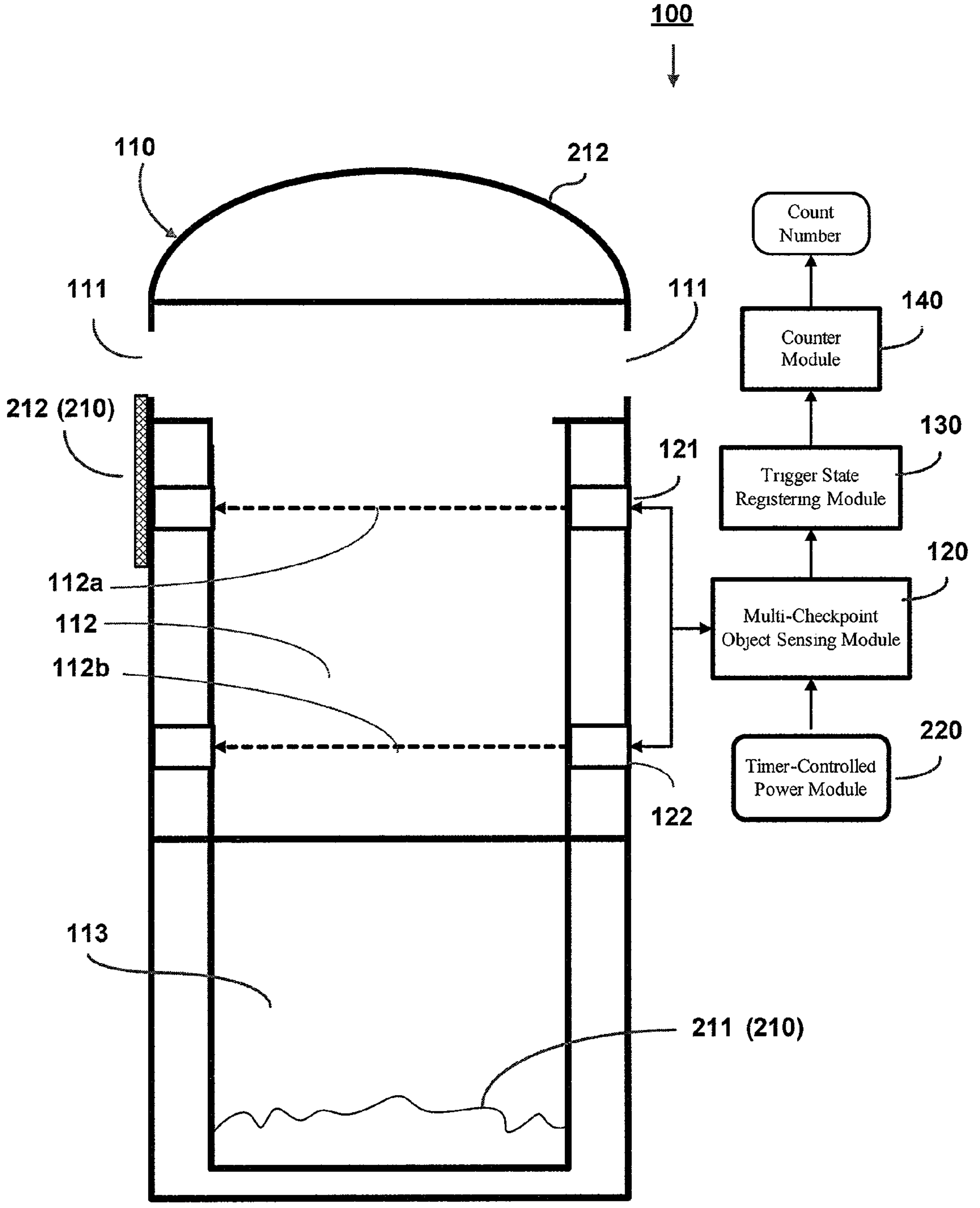
FIG. 3 is a schematic diagram showing the architecture of the multi-checkpoint type clustered animal counting device of the invention.

As shown in FIG. 3, in construction, the animal counting device of the invention 100 comprises: (A) a container module 110; (B) a multi-checkpoint object sensing module 120; (C) a trigger state registering module 130; and (D) a counter module 140; and can further optionally comprise: decoying means 210 and a timer-controlled power module 220. Firstly, the respective attributes and functions of these constituent elements of the invention are described in details in the following.

Container Module 110

The container module 110 has an entrance opening 111, a passage 112, and an internal trapping room 113. The entrance opening 111 allows an individual pest to enter into the passage 112 and crawl into the trapping room 113. Along the passage 112, at least two checkpoints are arranged, including a first checkpoint **112*a* and a second checkpoint 112*b*. The trapping room 113 is equipped with an enterable-but-inescapable door mechanism that allows each individual pest to easily enter into the trapping room 113 and can prevent all pests in the trapping room 113** from escaping.

Multi-Checkpoint Object Sensing Module 120

The multi-checkpoint object sensing module 120 includes at least two object sensors, including a first object sensor 121 and a second object sensor 122 (it is to be noted that the number of object sensors in this multi-checkpoint object sensing module 120 can be 3, 4, 5, or more). In practice, for example, the first object sensor 121 and the second object sensor 122 can be each implemented with an infrared-interrupt type of object sensor or an RF (radio frequency) radar type proximity sensor.

The first object sensor 121 is installed at the first checkpoint **112*a* along the passage 112 of the container module 110. In operation, the first object sensor 121 is initially set to power-on state (ON) for sensing whether a pest appears at the first checkpoint 112*a*. If yes, the first object sensor 121** will respond by generating a first trigger signal and still remain in power-on state (ON).

The second object sensor 122 is installed at the second checkpoint **112*b* along the passage 112 of the container module 110. In operation, the second object sensor 122 is initially set to power-off state (OFF) and capable of being switched to power-on state (ON) in response to the first trigger signal generated by the first object sensor 121 for sensing whether the pest that previously appeared at the first checkpoint 112*a* appears at the second checkpoint 112*b*. If yes, the second object sensor 122** will respond by generating a second trigger signal.

Trigger State Registering Module 130

The trigger state registering module 130 includes a set of flags used for indicating the respective trigger states of the multi-checkpoint object sensing module 120. In this embodiment, since the multi-checkpoint object sensing module 120 includes two object sensors 121, 122, the trigger state registering module 130 correspondingly includes two flags (F1, F2), where the first flag F1 is used for indicating the trigger state of the first object sensor 121, while the second flag F2 is used for indicating the trigger state of the second object sensor 121.

FIG. 5 is a truth table showing the values of (F1, F2) in response to the respective trigger states of the first object sensor 121 and the second object sensor 122. In this truth table, "0" represents untriggered state, while "1" represents triggered state.

When a pest is hovering at the entrance opening 111 of the container module 110, it will not trigger the first object sensor 121 and the second object sensor 122. As a result, at this time, (F1, F2)=(0, 0).

Subsequently, when the same pest enters into the passage 112 and reaches at the first checkpoint **112*a*, the pest will interrupt the IR beam emitted from the first object sensor 121**

Figure 4:
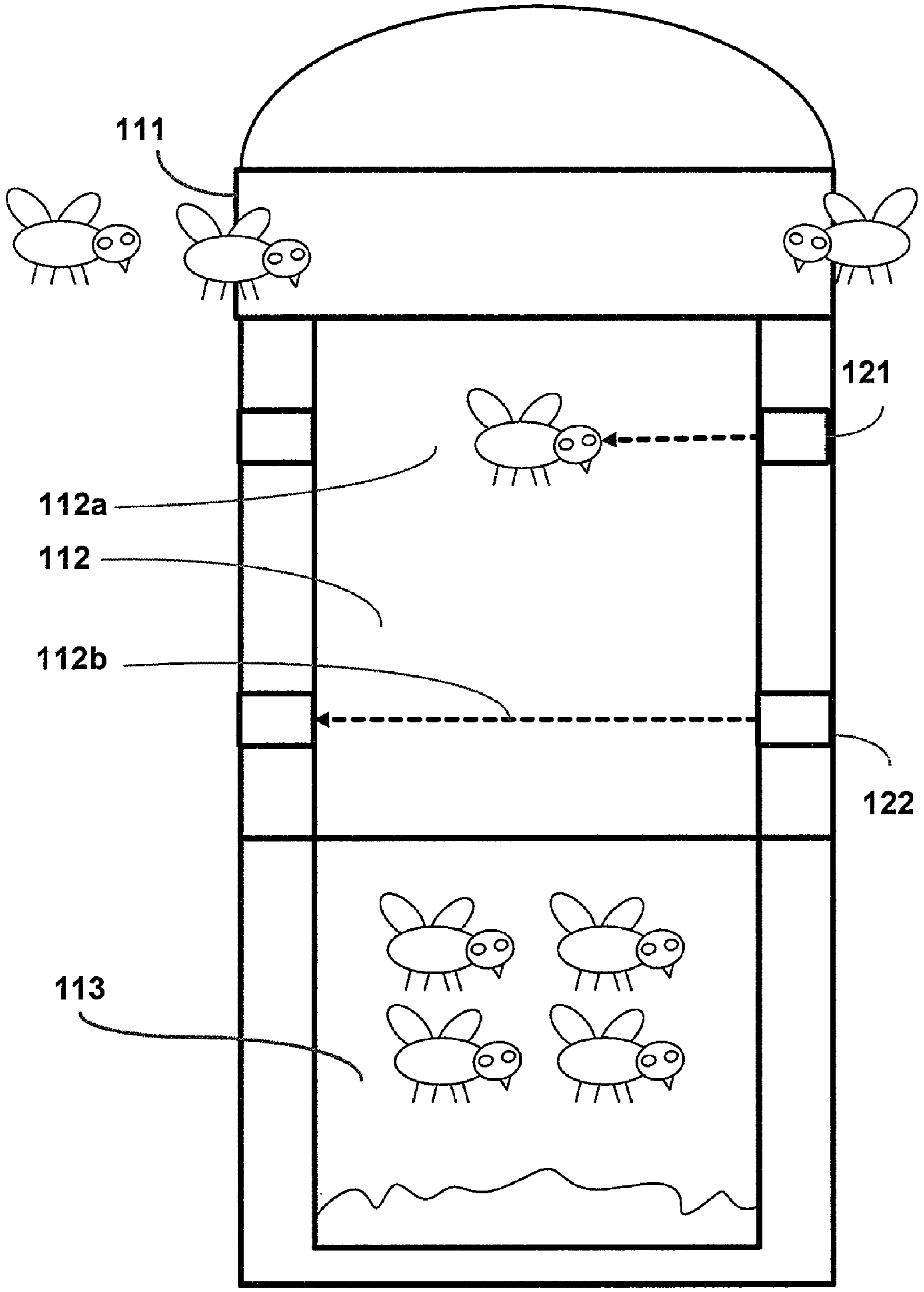
FIG. 4 is a schematic diagram used to depict the condition of a number of pests being lured and counted by the multi-checkpoint type clustered animal counting device of the invention.

(in the case that the first object sensor 121 is an infrared-interrupt type of object sensor) as illustrated in FIG. 4, thereby triggering the first object sensor 121 to generate a first trigger signal, causing (F1, F2)=(1, 0). The first trigger signal generated by the first object sensor 121 will additionally cause the second object sensor 122 to be switched from power-off state (OFF) to power-on state (ON).

Afterwards, if the same pest crawls further into the passage 112 and reaches at the second checkpoint 112*b*, the pest will interrupt the IR beam emitted from the second object sensor 122, thereby triggering the second object sensor 122 to generate a second trigger signal, causing (F1, F2)=(1, 1). The condition of (F1, F2)=(1, 1) will then cause the generation of a count-enable signal to the counter module 140. After this, the trigger state registering module 130 will reset the first flag F1 to 0, i.e., (F1, F2)=(0, 1).

Counter Module 140

The counter module 140 is used to provide a counting function and capable of outputting a count number whose value is initially set to zero and can be increased by one in response to each occurrence of the count-enable signal from the trigger state registering module 130, i.e., when (F1, F2)=(1, 1). Other than this condition, the output count number remains unchanged, as depicted in FIG. 5. The output count number from this counter module 140 represents the total number of pests that have passed through the passage 112 and trapped in the trapping room 113.

In practice, the output count number data from the counter module 140 can be directly displayed on a built-in LCD screen (not shown), so that research/management personnel can read the count number data directly from the built-in LCD screen. Alternatively, the output count number data can be transferred to a sensor node 31 in the wireless sensing network 30 shown in FIG. 1, so that the count number data can be transferred via the gateway 40 in a wireless manner to the host server 50, which allows research/management personnel to read the count number data by means of a network workstation 11 via the Internet (i.e., the network system 10).

Decoying Means 210

The decoying means 210 is used for luring the pests on the outside to enter into the entrance opening 111 and then pass through the passage 112 into the trapping room 113, so that each pest passing through the passage 112 can be counted. In practice, for example, the decoying means 210 includes an aromatic odorant 211 and a luring color plate 212.

The aromatic odorant 211 can produce an aromatic odor that is particularly attractive to the pest being counted. In the case of the pests being fruit flies, the aromatic odorant 211 can be methyl eugenol.

The luring color plate 212 is used to provide a color that is particularly visually attractive to the pest being counted, and which is preferably placed at the entrance opening 111 of the container module 110 so that it can be used to lure the pests on the outside to crawl into the container module 110. In the case of the pests being fruit flies, the most effective luring color is yellow or yellowish-green.

Timer-Controlled Power Module 220

The timer-controlled power module 220 is used to provide a timer-controlled power on/off switching function for the circuit part of the animal counting device of the invention 100. By using this timer-controlled power module 220, the research/management personnel can preset a specific time period when the power is to be switched on or off. For example, in the case of the pests being fruit flies which typically live actively at nighttime and rest at daytime, the research/management personnel can preset the power-on time to be 19:00PM in the evening, and power-off time to be 06:00 AM in the morning of the next day, which allows the animal counting device of the invention 100 to be set in active operation only during nighttime from 19:00PM to 06:00 AM of the next day; and during the daytime, the power is switched off for saving electricity.

Operation of the Invention

The following is a detailed description of a practical application example of the animal counting device of the invention 100 in actual operation. In this application example, it is assumed that the pests to be counted are fruit flies.

When the animal counting device of the invention 100 is powered on, it is initialized in such a manner that the counter module 140 sets its output count number to zero, the first object sensor 121 is set to power-on state (ON), the second object sensor 122 is set to power-off state (OFF), and the trigger state registering module 130 sets its flags (F1, F2)=(0, 0).

During operation, the fruit flies hovering around the animal counting device of the invention 100 will be lured by the yellow or yellowish-green color on the luring color plate 212 and thus gather at the entrance opening 111 of the container module 110. Further, these fruit flies will be lured by the smell provided by the aromatic odorant 211 to crawl through the passage 112 and enter into the trapping room 113 where each entered fruit fly will be trapped and unable to escape.

When a first fruit fly reaches at the first checkpoint 112*a*, it will trigger the first object sensor 121 to generate a first trigger signal. In response to this first trigger signal, the second object sensor 122 will be promptly switched from power-off state (OFF) to power-on state (ON), and meanwhile the trigger state registering module 130 will promptly set the first flag F1 to 1, i.e., (F1, F2)=(1, 0). In the condition of (F1, F2)=(1, 0), the counter module 140 keeps its count number unchanged.

Afterwards, when the same fruit fly crawls further into the passage 112 and reaches at the second checkpoint 112*b*, the fruit fly will trigger the second object sensor 122 to generate a second trigger signal. In response to this second trigger signal, the trigger state registering module 130 will promptly set the second flag F2 to 1, i.e., (F1, F2)=(1, 1). The condition of (F1, F2)=(1, 1) will cause the trigger state registering module 130 to generate a count-enable signal for the counter module 140, causing the counter module 140 to increase its output count number by 1. After this, the first flag F1 is reset to 0, i.e., (F1, F2)=(0, 1). Afterwards, when the first fruit fly enters into the trapping room 113, it will be trapped therein and unable to escape, allowing the other fruit flies following behind to pass through the passage 112.

In a similar manner, when a second fruit fly crawls through the passage 112, it will firstly trigger the first object sensor 121 at the first checkpoint 112*a*, causing the second object sensor 122 to be switched to power-on state. If this fruit fly proceeds onwards, it will trigger the second object sensor 122 at the second checkpoint 112*b*, causing the second object sensor 122 to generate a second trigger signal, thereby activating the counter module 140 to increase its output count number by 1. When the second fruit fly enters into the trapping room 113, it will also be trapped therein and unable to escape.

When a swarm of fruit flies enter the passage 112 one by one, the above-mentioned counting operation will be repeated again and again for counting the total number of the fruit flies passing through the passage 112 and trapped in the trapping room 113. The output count number from the counter module 140 is then used as the end output result 102 by the invention.

During the above-mentioned process, if a certain fruit fly retreats backwards after passing the first checkpoint 112*a* before reaching at the second checkpoint 112*b*, then since the second object sensor 122 at the second checkpoint 112*b* is untriggered, the counter module 140 will keep its output count number unchanged. Moreover, in the case that a fruit fly lingers at the first checkpoint 112*a* for a long time and repeatedly flaps its wings, then since the second object sensor 122 is untriggered, i.e., (F1, F2)=(1, 0), the repeated wing flapping of the fruit fly will not cause the output count number to be erroneously increased.

Subsequently, if one fruit fly proceeds onward to the second checkpoint 112*b* and repeatedly flaps its wings at the second checkpoint 112*b* for a long time and, then since the first flag F1 will be reset to 0 immediately after the output count number is increased by 1, i.e., (F1, F2)=(0, 1), the repeated wing flapping of the fruit fly will cause the output count number to be increased only once and not repeatedly increased in an erroneous manner.

In conclusion, the invention provides a multi-checkpoint type clustered animal counting device, which is characterized by the utilized to at least two object sensors, wherein the first object sensor is disposed at a first checkpoint while the second object sensor is disposed at a second checkpoint, and wherein the first object sensor is initially set to power-on state while the second object sensor is initially set to power-off state and can be switched on only when the first object sensor is triggered. When the second object sensor is triggered, the counting operation will increase the output count number by one. This feature allows a more accurate result and can help save power consumption. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for operating a multi-checkpoint type clustered fruit fly counting device used to count a group of fruit flies, the multi-checkpoint type clustered fruit fly counting device comprising:

a container module, which has an entrance opening, a passage, and an internal trapping room; wherein the passage is arranged with at least two checkpoints including a first checkpoint and a second checkpoint;

a multi-checkpoint object sensing module, which includes at least two object sensors including a first object sensor and a second object sensor; wherein the first object sensor is installed at the first checkpoint along the passage of the container module; and the second object sensor is installed at the second checkpoint in the passage of the container module;

a trigger state registering module, which includes at least two flags respectively used for registering the trigger state of the first object sensor and the second object sensor, and is capable of generating a count-enable signal when both the first object sensor and the second object sensor are set to switch-on mode; and a counter module, which is capable of outputting a count number whose value is increased by one in response to each occurrence of the count-enable signal from the trigger state registering module by a wireless sensing network, and receiving a remote control signal by the wireless sensing network, the method comprising: initially setting the first object. sensor to the switch-on mode for sensing whether a fruit fly appears at the first checkpoint, and if yes, enabling the first object sensor to generate a first trigger signal; initially setting the second object sensor to switch-off mode and enabling the second object to be activated by the first trigger signal generated by the first object sensor for sensing whether the fruit fly that previously appeared at the first checkpoint now appears at the second checkpoint, and if yes, enabling the second object sensor to generate a second trigger signal; and allowing the first object sensor to always remain in the switch-on mode, and the second object sensor to shift to the switch-off mode after generating the second trigger signal and shift to the switch-on mode again after another fruit fly appears at the first checkpoint and the first object sensor has generated the first trigger signal again.

2. The method of claim 1, wherein the first object sensor is an infrared-interrupt type of object sensor.

3. The method of claim 1, wherein the first object sensor is an RF (radio frequency) radar type proximity sensor.

4. The method of claim 1, wherein the second object sensor is an infrared-interrupt type of object sensor.

5. The method of claim 1, wherein the second object sensor is an RF (radio frequency) radar type proximity sensor.

6. The method of claim 1, wherein the multi-checkpoint type clustered fruit fly counting device further comprises:

decoying means for providing a luring effect that lures the fruit flies being counted to enter into the container module.

7. The method of claim 6, wherein the decoying means includes:

an aromatic odorant, which is placed in the trapping room for providing an aromatic odor that lures the fruit flies being counted to enter into the container module.

8. The method of claim 7, wherein the aromatic odorant is methyl eugenol.

9. The method of claim 6, wherein the decoying means includes:

a luring color plate, which is placed at the entrance opening of the container module for providing fruit flies-luring color.

10. The method of claim 9, wherein the fruit flies-luring color is yellow.

11. The method of claim 9, wherein the fruit flies-luring color is yellowish-green.

12. The method of claim 1, wherein the multi-checkpoint type clustered fruit fly counting device further comprises:

a timer-controlled power module to provide a timer-controlled power on/off switching function for the sampled-counting operation.

13. A method for operating a multi-checkpoint type clustered fruit fly counting device used to count a group of fruit flies, the multi-checkpoint type clustered fruit fly counting device comprising:

a container module, which has an entrance opening, a passage, and an internal trapping room; wherein the passage is disposed with at least two checkpoints including a first checkpoint and a second checkpoint;

decoying means for providing a luring effect that lures the fruit flies being counted to enter into the container module;

a multi-checkpoint object sensing module, which includes at least two object sensors including a first object sensor and a second object sensor; wherein the first object sensor is installed at the first checkpoint in the passage of the container module; and the second object sensor is installed at the second checkpoint in the passage of the container module;

a trigger state registering module, which includes at least two flags respectively used for registering the trigger state of the first object sensor and the second object sensor, and is capable of generating a count-enable signal when both the first object sensor and the second object sensor are set to switch-on mode;

a counter module, which is capable of outputting a count number whose value is increased by one in response to each occurrence of the count-enable signal from the trigger state registering module by a wireless sensing network, and receiving a remote control signal by the wireless sensing network; and a timer-controlled power module, the method comprising: initially setting the first object sensor to the switch-on mode for sensing whether an object appears at the first checkpoint, and if yes, enabling the first object sensor to generate a first trigger signal; initially setting the second object sensor to switch-off mode and enabling the second object sensor to be activated by the first trigger signal generated by the first object sensor for sensing whether the object that previously appeared at the first checkpoint now appears at the second checkpoint, and if yes, enabling the second object sensor to generate a second trigger signal; and allowing the first object sensor to always remain in the switch-on mode, and the second object sensor to shift to the switch-off mode after generating the second trigger signal and shift to the switch-on mode again after another fruit fly appears at the first checkpoint and the first object sensor has generated the first trigger signal again; and enabling the timer-controlled power module to provide a timer-controlled power on/off switching function for the sampled-counting operation.

14. The method of claim 13, wherein the first object sensor is an infrared-interrupt type of object sensor.

15. The method of claim 13, wherein the first object sensor is an RF (radio frequency) radar type proximity sensor.

16. The method of claim 13, wherein the second object sensor is an infrared-interrupt type of object sensor.

17. The method of claim 13, wherein the second object sensor is an RF (radio frequency) radar type proximity sensor.

18. The method of claim 13, wherein the decoying means includes:

an aromatic odorant, which is placed in the trapping room for providing an aromatic odor that lures the fruit flies being counted to enter into the container module.

19. The method of claim 18, wherein the aromatic odorant is methyl eugenol.

20. The method of claim 13, wherein the decoying means includes:

a luring color plate, which is placed at the entrance opening of the container module for providing fruit flies-luring color.

21. The method of claim 20, wherein the fruit flies-luring color is yellow.

22. The method of claim 21, wherein the fruit flies-luring color is yellowish-green.

* * * * *